United States Patent [19]

White

[11] Patent Number: 4,486,884
[45] Date of Patent: Dec. 4, 1984

[54] TUNABLE ANTI-STOKES RAMAN LASER

[75] Inventor: Jonathan C. White, Lincroft, N.J.

[73] Assignee: AT&T Bell Laboratories, Murray Hill, N.J.

[21] Appl. No.: 376,416

[22] Filed: May 10, 1982

[51] Int. Cl.³ .............................................. H01S 3/30
[52] U.S. Cl. ......................................... 372/3; 372/39; 372/20; 372/69
[58] Field of Search ..................... 372/3, 69, 70, 5, 56, 372/41, 20, 39; 307/425

[56] References Cited

PUBLICATIONS

White et al., "Tunable, 178 nm Iodine Anti-Stokes Raman Laser", Opt. Lett., vol. 7, No. 5, May 1982.
White et al., "Anti-Stokes Raman Laser", Phys. Rev. A, vol. 25, No. 2, Feb. 1982, pp. 1226–1229.
White, "Inversion of the Na Resonance Line by Selective Photodissociation of NaI", Appl. Phys. Lett., 33, (4), Aug. 15, 1978.
White et al., "Tuning and Saturation Behavior of the Anti-Stokes Raman Laser", AIP Conf. Proceed., No. 100, No. 3, Excimer Lasers 1983, edited by Rhodes et al.

Primary Examiner—William L. Sikes
Assistant Examiner—Léon Scott, Jr.
Attorney, Agent, or Firm—Erwin W. Pfeifle; Wendy W. Koba

[57] ABSTRACT

An anti-Stokes Raman laser is disclosed which is tunable over a range of 10–70 $cm^{-1}$. An alkali halide is used as the lasing medium and a metastable halide population inversion is created with respect to the ground state of the halide by selective photodissociation of the alkali halide. A pump laser is then employed to move the population from the metastable state to a region near an intermediate state of the halide. The population subsequently falls back to the initial ground state, thereby creating the anti-Stokes Raman emission. Since the intensity of the photodissociation is directly proportional to the amount of population inversion achieved, and hence, to the region the population may be pumped to, the tuning of the output anti-Stokes Raman lasing is a function of the intensity of the initial photodissociation.

6 Claims, 4 Drawing Figures

TUNABLE ANTI-STOKES RAMAN LASER

BACKGROUND OF THE INVENTION

1. Field of the Invention

The present invention relates to a tunable anti-Stokes Raman laser, and more particularly, to a tunable anti-Stokes Raman laser capable of generating vacuum ultraviolet (VUV) stimulated radiation by creating a metastable population inversion of an alkali halide through selective photodissociation.

2. Description of the Prior Art

In previous experiments, nonresonant anti-Stokes superfluorescence has been observed, and efficiency studies of the anti-Stokes Raman laser have been reported by J. C. White et al in an article entitled "Anti-Stokes Raman Laser" appearing in *Physical Review A*, February 1982. In those studies, a metastable $Tl^*(6p^2p°_{3/2})$ population inversion was utilized to Raman up-convert visible and near ultraviolet lasers into the 270-380 nm range.

An article entitled "Observation of Stimulated Anti-Stokes Raman Scattering in Inverted Atomic Iodine" by R. L. Carman et al in *Physical Review Letters*, Vol. 33, No. 4 at pp. 190-3 reports the measurement of anti-Stokes Raman gain from an inverted population in atomic iodine, where the population inversion was achieved by flash photolysis of trifluromethyliodide ($CF_3I$). The anti-Stokes Raman signal was observed by pumping this inversion with the fundamental of a Nd:YAG laser at 1.06 μm and probing the gain with a broadband dye laser. However, superfluorescent emission at the non-resonant anti-Stokes wavelength was not observed.

The dynamics of photodissociation of alkali halide systems into dipole allowed transistions has been studied extensively. One result of these studies, as disclosed in an article entitled "Inversion of the Na Resonance Line by Selective Photodissociation of NaI" by J. C. White appearing in *Applied Physics Letters*, Vol. 33, No. 4, Aug. 15, 1978 at pp. 325-327, is that the alkali halides absorb ultraviolet radiation with distinct peaks corresponding to transitions to excited molecular states which dissociate to specific atomic states of the alkali and halogen atoms. In particular, the inversion and intense superfluorescent emission of the Na resonance line by selective photodissociation of NaI was observed where the fifth harmonic of a Q-switched Nd:YAG laser at 2128 Å was used to photodissociate NaI to the unbound state $Na(3p^2p) + I(5p^5 \, ^2p_{3/2})$.

Although these experimental and theoretical investigations form prior art for both selective photodissociation and anti-Stokes Raman lasers, they do not teach their use for producing the unique results obtained by the present invention.

SUMMARY OF THE INVENTION

The present invention relates to a tunable anti-Stokes Raman laser, and more particularly, to a tunable anti-Stokes Raman laser capable of generating vacuum ultraviolet (VUV) stimulated radiation by creating a metastable population inversion of an alkali halide through selective photodissociation.

It is an aspect of the present invention to employ a pumping laser at 206 nm, thereby greatly decreasing the virtual detuning to an intermediate Raman level and thus producing VUV stimulated, anti-Stokes emission.

Yet another aspect of the present invention to provide a population inversion to a metastable state, instead of dipole-allowed state, since the metastable population may be stored over a long period of time and then rapidly extracted with an intense pump laser.

Other and further aspects of the present invention will become apparent during the course of the following description and by reference to the accompanying drawings.

DETAILED DESCRIPTION

For the purpose of the present discussion, the alkali halide sodium iodide (NaI) will be employed as the lasing medium of the present invention. It is to be understood that any alkali halide compound may be employed and will differ from NaI only with respect to the various energy levels related thereto. Thus, any alkali halide compound may be employed in accordance with the present invention to provide a tunable, anti-Stokes Raman laser. Alkali halides are used as the halogen donors in the present invention, rather than previously used organic compounds, since the alkali absorption at the produced VUV wavelength is small and predictable. The organic donors used in the past, for example, trifluromethyl ($CF_3$), absorbed too large of an amount of the VUV output emission to function adequately at any VUV wavelength.

In association with NaI, an $I^*(5p^5 \, ^2p°_{\frac{1}{2}})$ population inversion is created with respect to the $I(5p^5 \, ^2p°_{3/2})$ ground state. A 206 nm pump laser is used to drive the Raman process, resulting in stimulated emission at 178 nm with a pulse energy of, approximately, 35 μJ (i.e., 7 kW). An $I^*(5p^5 \, ^2p°_{\frac{1}{2}})$ metastable population inversion is created in accordance with the present invention by selective photodissociation of NaI at 248 nm using a KrF* excimer laser via the reaction $$NaI + \gamma(248 \text{ nm}) \rightarrow Na + I^*(5p^5 \, ^2p°_{\frac{1}{2}}). \qquad (1)$$

Figure 1:
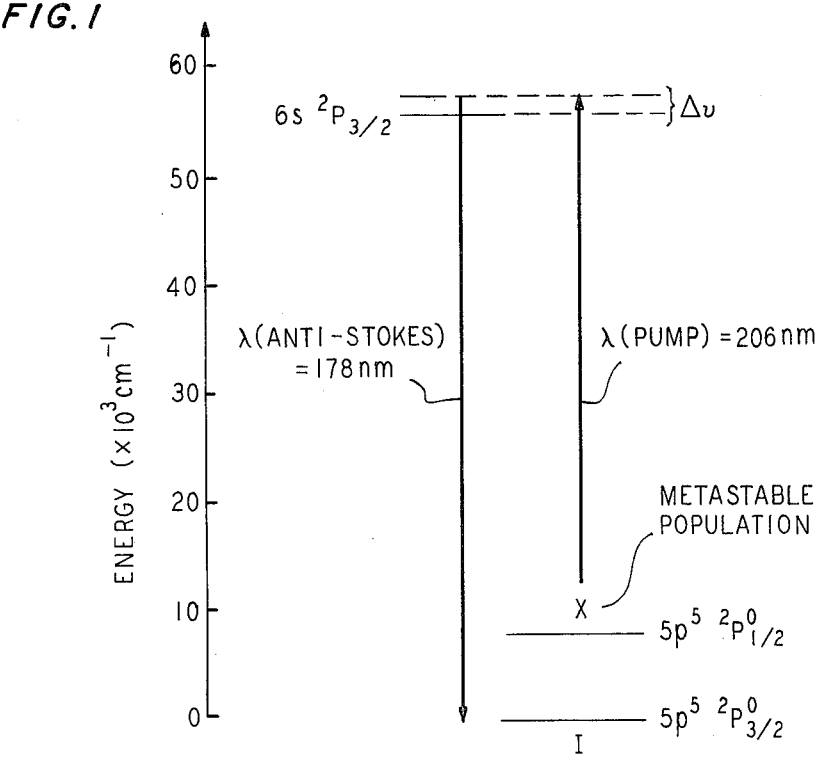
FIG. 1 illustrates the pertinent energy levels for anti-Stokes Raman lasing from inverted $I(5p^5 \, ^2p°_{\frac{1}{2}})$.

Since no ground state $I(5p^5 \, ^2p°_{3/2})$ atoms are created by this process, the excited metastable state is inverted with respect to ground. The location of the metastable I* population is illustrated in the energy level diagram of FIG. 1. As shown in FIG. 1, absorption of a strong pumping field tuned near λ=206 nm resonantly couples the I* metastable and ground states through the $6s \, ^2p_{3/2}$ level. Therefore, in accordance with the present invention, stimulated anti-Stokes emission at 178 nm will result, as illustrated in FIG. 1.

Figure 2:
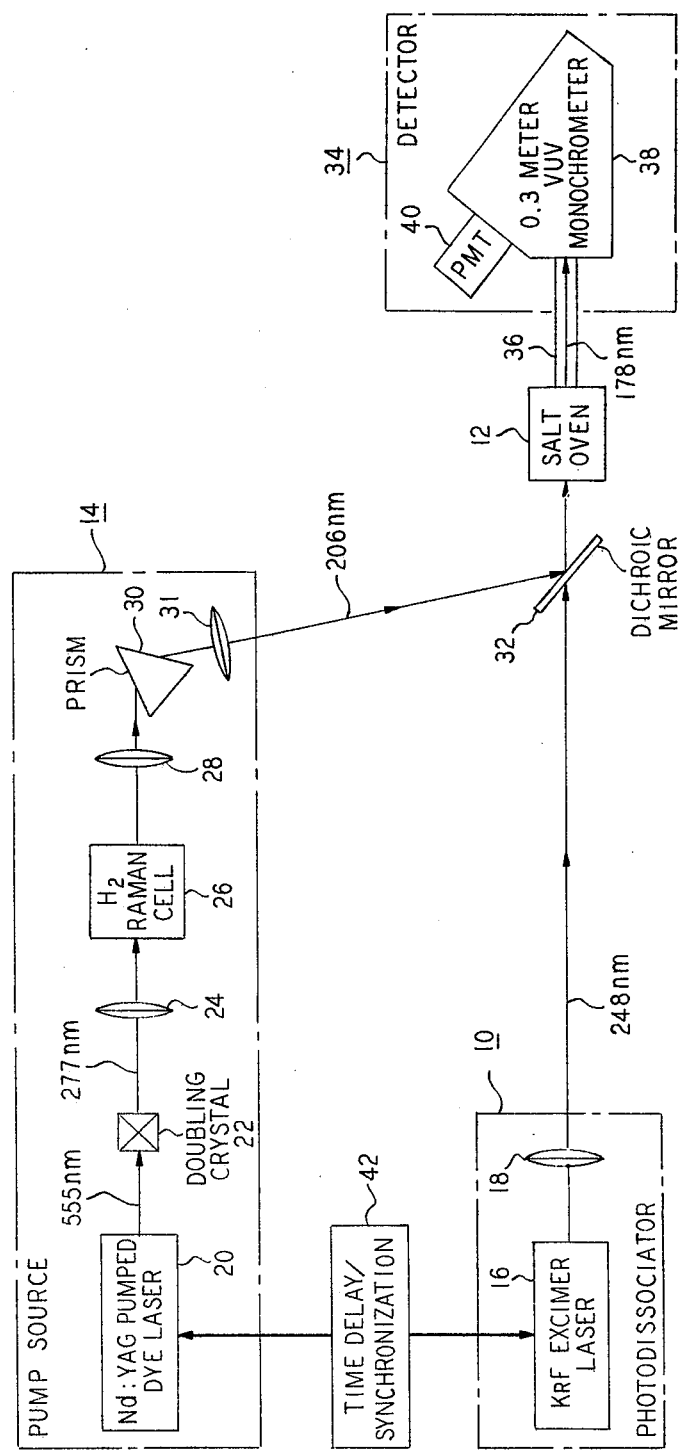
FIG. 2 illustrates a block diagram of one embodiment of the present invention comprising a separate pump source and a separate photodissociator.

An exemplary experimental apparatus capable of performing the above-described process in accordance with the present invention is illustrated in FIG. 2. In general, a photodissociator 10 produces a 248 nm light wave which interacts with the ground state NaI contained in a salt oven 12 to dissociate the compound in accordance with equation (1) and create the I*($5p^5\ ^2p°_{\frac{1}{2}}$) metastable population inversion. The anti-Stokes Raman lasing at 178 nm is then initiated by a pump source 14 which produces a 206 nm light wave which is subsequently applied as an input to salt oven 12 which now contains the dissociated I*($5p^5\ ^2p°_{\frac{1}{2}}$).

As shown in FIG. 2, photodissociator 10 comprises a KrF* excimer laser 16 and a focusing lens 18. KrF* excimer laser 16, a type of laser which is well known in the art, produces the actual 248 nm light wave which is then passed through focusing lens 18 and applied as an input to salt oven 12. Salt oven 12 may be a simple stainless steel oven with cold $CaF_2$ windows, where any VUV transparent buffer gas may be used to prevent NaI vapor condensation on the windows.

Pump source 14, as shown in FIG. 2, contains a Nd:YAG laser 20 which is used to pump a rhodamine 590 nm dye laser to yield a 70 mJ/pulse light wave at 555 nm with a measured linewidth of 0.2 cm$^{-1}$. This radiation at 555 nm is subsequently applied as an input to a $KH_2PO_4$ (KDP) doubling crystal 22 which functions to double the frequency of the radiation applied as an input thereto, and will, therefore, produced an output a 15 mJ/pulse light wave at 277 nm. Both the doubled light at 277 nm and the fundamental light at 555 nm pass through a focusing lens 24 and are subsequently applied as a focused input to an $H_2$ Raman cell 26 which is operated at 100 psi. $H_2$ Raman cell 26 functions as a 4-wave parametric mixer and produces the desired pump wave at 206 nm. The output from $H_2$ Raman cell 26 is subsequently focused through a lens 28 and passed through a prism 30. Prism 30 is positioned in a manner whereby the third anti-Stokes wavelength at 206 nm, the wavelength necessary to initiate lasing, is separated out and focused through lens 31 to an area of approximately $3 \times 10^{-3}$ cm$^2$ and spatially overlapped with the 248 nm laser output from photodissociator 10. The spatial overlapping is accomplished via a dichroic mirror 32, which passes the 248 nm wavelength and reflects the 206 nm wavelength. The lasing output from salt oven 12, which is the desired 178 nm Raman emission, may be observed by a detector 34 which is coupled to the output of salt oven 12 via an evacuated tube 36. In one form, detector 34 may comprise a 0.3 meter VUV monochrometer 38 equipped with a photomultiplier tube (PMT) 40.

The anti-Stokes Raman gain cross section, $\sigma_R$, may be calculated (assuming a near resonant, three level approximation) from the equation $$\sigma_R = \frac{c^4 f_1 f_2 \nu_R I}{32 \pi^3 \epsilon_0^2 m^2 h c^2 \nu_1 \nu_2 (\Delta \nu)^2 \Delta} ,\quad (2)$$

where $f_1$ and $f_2$ are the oscillator strengths connecting the initial and final states to the intermediate level, $\nu_1$ and $\nu_2$, respectively, are the frequencies associated therewith, $\nu_R$ is the anti-Stokes frequency, I is the pump laser intensity, $\Delta\nu$ is the virtual detuning and $\Delta$ is the Raman linewidth. For the example discussed hereinabove for NaI, $f_1 = 3.8 \times 10^{-3}$, $f_{215} = 1.3 \times 10^{-4}$, $\nu_1 = 1.45 \times 10^{15}$ sec$^{-1}$, $\nu_2 \cong \nu_R = 1.68 \times 10^{15}$ sec$^{-1}$, and $\Delta = 1.5 \times 10^9$ sec$^{-1}$. Therefore, the gain cross section from equation (2) may be rewritten as $$\sigma_R = 4.4 \times 10^{-21} I (\Delta \nu)^{-2}\ cm^2, \quad (3)$$

where I is in units of W/cm$^2$ and $\Delta\nu$ is in units of cm$^{-1}$.

The temporal overlap of the 248 nm laser output from photodissociator 10 and the 206 nm laser output from pump source 14 may be controlled, as mentioned hereinabove, by a time delay/synchronization means 42. Time delay/synchronization means 42, which may be a programmable precision delay generator, allows accurate control over the arrival of the laser pulses at salt oven 12 by controlling the initialization of both KrF* excimer laser 16 of photodissociator 10 and Nd:YAG dye laser 20 of pump source 14. The intensity of the 178 nm anti-Stokes Raman laser output of salt oven 12 is a function of the time delay, as controlled by synchronization means 42, between the arrival of the dissociation laser at 248 nm and pump laser at 206 nm, and synchronization means 42 may be employed to investigate the effective storage time of the I* metastable states.

Figure 3:
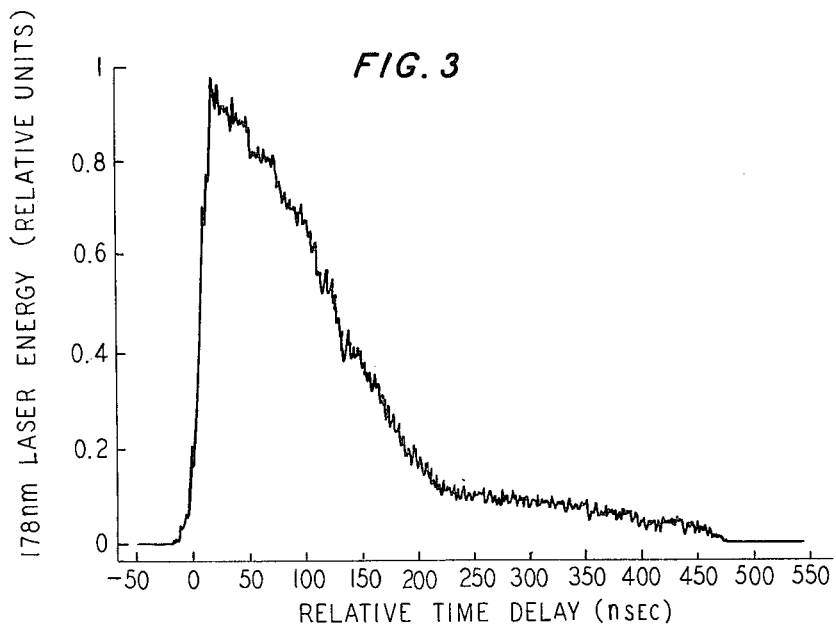
FIG. 3 illustrates laser emission at 178 nm as a function of the relative delay between the operation of the photodissociator and pump source of the embodiment illustrated in FIG. 2.

FIG. 3 illustrates the laser emission output of salt oven 12 at 178 nm as a function of the relative delay supplied by synchronization means 42 between the 248 nm dissociation pulse and the 206 nm pump pulse as measured in nanoseconds. For the data shown in FIG. 3, the 206 nm pump laser is adjusted to be resonant with the $6s^2 p_{3/2}$ level. Positive relative delay corresponds to the 206 nm pulse arriving after the 248 nm in salt oven 12. For negative delay, the 206 nm pump pulse arrives in salt oven 12 prior to the dissociation pulse; and since no I* mestastables exist prior to dissociation, the 178 nm laser will not be observed, corresponding to the zero laser energy level contained in the graph of FIG. 3. The largest 178 nm signal is created, as seen by reference to FIG. 3, for a relative delay of approximately 20 nsec. A 178 nm laser may be observed up to a relative delay on approximately 500 nsec, or 0.5 $\mu$sec. Past this point the 178 nm laser emission is abruptly terminated due to insufficient metastable population. This storage time of approximately 0.5 $\mu$sec is within an order of magnitude of the diffusion time for I* atoms out of the interaction region that may be estimated assuming a cross-section for I*-Ar collision of $10^{-16}$ cm$^2$. Therefore, the metastable population may be stored over a relatively long period of time and subsequently rapidly extracted with an intense pump laser, allowing the present invention to provide an excellent source of laser radiation.

The 206 nm pump laser can be tuned 5-6 cm$^{-1}$ to either side of the $6s^2\ P_{3/2}$ intermediate state and still maintain lasing at 178 nm. Thus, a tuning range of approximately 10 cm$^{-1}$ exists for a 178 nm Raman laser formed in accordance with the present invention. Due to their inherent tunability and high conversions efficiency, anti-Stokes Raman lasers are useful as coherent sources in the vacuum ultraviolet region. It is to be understood that by utilizing other halogen atoms or various metals as storage media, a wide variety of tunable, high power anti-Stokes lasers may be constructed in the 100 nm to 200 nm range.

Figure 4:
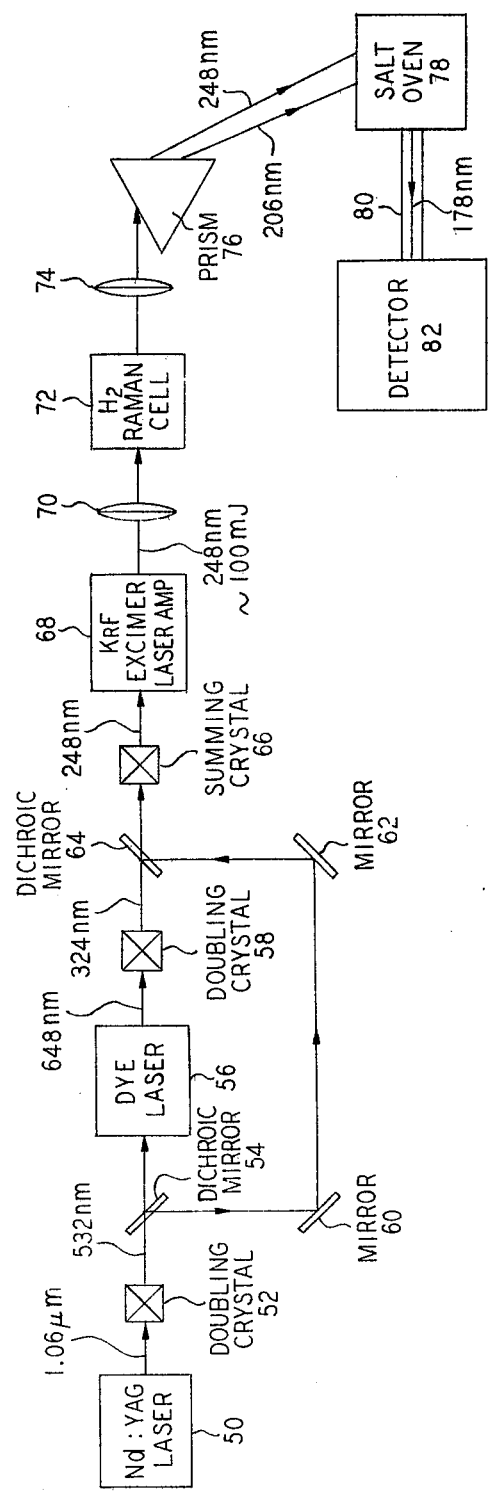
FIG. 4 illustrates a block diagram of an alternative embodiment of the present invention which is self-synchronous, i.e., deriving both the pump and dissociator from the same source.

An alternative arrangement of the present invention is illustrated in FIG. 4. In contrast to the arrangement shown in FIG. 2, the arrangement shown in FIG. 4 does not contain a separate photodissociator and pump source; rather these two separate wavelengths of 248 nm and 206 nm, respectively, are created by the same source. Thus, this particular embodiment does not require an external time delay/synchronizer to obtain the maximum intensity anti-Stokes Raman lasing output.

Referring now to FIG. 4, the initial source of both the photodissociating beam at 248 nm and the pump beam at 206 nm is a Nd:YAG laser 50 which, as is well known, produces laser emission at $\lambda = 1.06$ μm at room temperature. The 1.06 μm output from Nd:YAG laser 50 is subsequently applied as an input to a first doubling crystal 52, for example, a KDP crystal, which functions to double the frequency of the 1.06 μm wave. Therefore, doubling crystal 52 produces as an output a wave containing both the 1.06 μm wave and the second harmonic thereof at 532 nm. The output of doubling crystal 52 subsequently impinges a first dichroic mirror 54 which functions to reflect the 1.06 μm wave while allowing the 532 nm wave to pass through unimpeded. The 532 nm wave is subsequently applied as an input to a dye laser 56 which functions to pump the 532 nm wave a predetermined amount, where for the purposes of the present invention, the 532 nm wave is pumped to 648 nm. The 648 nm output from dye laser 56 is then doubled in a second doubling crystal 58 to produce an output at 324 nm.

The 1.06 μm wave reflected by dichroic mirror 54 is subsequently reflected by a pair of mirrors 60 and 62 and directed onto a second dichroic mirror 64 which is placed in the path of the 324 nm output from second doubling crystal 58. Second dichroic mirror 64 thus passes the 324 nm output from second doubling crystal 58 and reflects the 1.06 μm wave, where both waves are subsequently applied as an input to a summing crystal 66. The output of summing crystal 66 will be the sum of the frequencies applied as an input thereto and in this embodiment of the present invention, the output will be a 248 nm wave, the wavelength necessary to accomplish the photodissociation of the NaI compound, as defined in equation (1).

At this point, the 248 nm wave is applied as an input to a KrF excimer laser 68, which in this arrangement of the present invention operates as an amplifier and produces as an output a 248 nm wave with an energy of approximately 100 mJ. The output from KrF excimer laser amplifier 68 is subsequently focused through a focusing lens 70 and applied as an input to an $H_2$ Raman cell 72. $H_2$ Raman cell 72, like $H_2$ Raman cell 26 of FIG. 2, operates as a 4-wave parametric mixer, producing as an output a wave comprising the harmonics necessary to perform the lasing of the present invention. The output from $H_2$ Raman cell 72 is subsequently passed through a focusing lens 74 and a prism 76 which separates out the necessary wavelengths for the purposes of the present invention, i.e., the 248 nm photodissociating wavelength and the 206 nm pump wavelength.

The remainder of the process illustrated in FIG. 4 is identical to that described hereinabove in relation to the embodiment illustrated in FIG. 2. In particular, the 248 nm photodissociating wave and the 206 nm pump wave are applied as inputs to a NaI salt over 78 which may, for example, comprise the same arrangement as salt oven 12 of FIG. 2. Thus, the arrangement illustrated in FIG. 4 provides the same lasing output, i.e., at 178 nm, as that illustrated in FIG. 2. This lasing output subsequently passes through an evacuated tube 80 and into a detector 82 which may comprise an arrangement similar to that described hereinabove in association with detector 34 of FIG. 2.

In association with the embodiment illustrated in FIG. 4, the 206 nm pump will comprise an energy of approximately 1–5 mJ, since the 248 nm was amplified to an energy of approximately 100 mJ yielding an increase in output of 50. In association with equation (3), since the gain cross-section $\sigma_R$ is proportional to $(\Delta v)^{-2}$, where $\Delta v$ is defined as the virtual detuning, a tuning range for this arrangement of the present invention is approximately $\sqrt{50 \times 10}$ cm$^{-1}$, or 70 cm$^{-1}$.

What is claimed is:

1. A tunable anti-Stokes Raman laser comprising
    an alkali halide lasing medium (e.g., 12, 78) including a ground state, an intermediate state, and at least one metastable state;
    photodissociating means (e.g., 10, 66, 68) for creating a population inversion between said ground state and a metastable state of said alkali halide lasing medium; and
    anti-Stokes pump means (e.g., 14, 72, 76) for creating a transition between said metastable state and predetermined region near said intermediate state of said alkali halide lasing medium, thereby creating a Raman lasing output from said predetermined region to said ground state, where said predetermined region is varied to form said tunable anti-Stokes Raman laser.

2. A tunable anti-Stokes Raman laser formed in accordance with claim 1 wherein said tunable laser further comprises
    a dichroic mirror (32) capable of spatially overlapping and directing the output of both the photodissociator (10) and the pump source (12) towards the alkali halide lasing medium; and
    a time delay/synchronizing means (42) for separately initiating both said photodissociator and said pump source such that said output from said photodissociator arrives at said alkali halide medium a predetermined time interval before said output of said pump source arrives at said lasing medium, thereby controlling the intensity of the Raman lasing output of said alkali halide lasing medium.

3. A tunable anti-Stokes Raman laser formed in accordance with claim 2 wherein
    the photodissociator comprises a KrF* excimer lasing means (16) responsive to the time/delay synchronizing means for providing an emission at a predetermined wavelength capable of photodissociating the alkali halide wherein said emission is the output of said photodissociator; and
    the pump source comprises
    a dye pumped lasing means (20) responsive to said time/delay synchronizing means for producing a lasing emission at a first wavelength;
    a doubling crystal (22) responsive to said lasing emission produced by said dye pumped lasing means for generating a lasing emission at the second harmonic thereof comprising a second wavelength equal to one-half of said first wavelength;
    mixing means (26) responsive to both said lasing emission at said first wavelength and said lasing emission at said second wavelength for producing as an output a plurality of wavelengths related to a multiplicative product of said first and second wavelengths; and
    filtering means (30) responsive to said plurality of wavelengths produced by said mixing means for separating a pump beam at a third wavelength of said plurality of wavelengths and directing said pump beam output from said pump source toward the dichroic mirror.

4. A tunable anti-Stokes Raman laser formed in accordance with claim 1 wherein the photodissociating means comprises a lasing source (50) for producing a lasing emission at a first wavelength;

modulating means (52, 54, 56, 58, 64, 66) responsive to said lasing emission at said first wavelength for producing as an output a photodissociating emission at a second wavelength; and amplifying means (68) responsive to said photodissociating emission at said second wavelength for increasing the power thereof and producing as an output a power photodissociating emission at said second wavelength for creating the population inversion between the ground state and the metastable state of the alkali halide lasing medium; and the anti-Stokes pump means comprises mixing means (72) responsive to the lasing emission at said first wavelength produced by said lasing source and said power photodissociating emission at said second wavelength for obtaining a multiplicative product thereof and producing as an output a pump emission at a third wavelength, said pump emission capable of creating the transition between said metastable state and the predetermined region near the intermediate state of said alkali halide lasing medium.

5. A tunable anti-Stokes Raman laser formed in accordance with claim 4 wherein the modulating means comprise a first doubling crystal (52) responsive to the lasing emission at the first wavelength produced by the lasing source for doubling the frequency thereof and producing as an output a doubled lasing emission at a fourth wavelength equal to one-half of said first wavelength;

a dye laser pumping means (56) responsive to said doubled lasing emission for producing a pumped emission at a fifth wavelength;

a second doubling crystal (58) responsive to said pumped emission at said fifth wavelength for doubling the frequency thereof and producing as an output a doubled pump emission at a sixth wavelength equal to one-half of said fifth wavelength;

a dichroic mirror (64) responsive to both said doubled pump emission and said lasing emission at said first wavelength for spatially overlapping said doubled pump emission and said lasing emission and producing said overlapped emissions as an output; and a summing crystal (66) responsive to said overlapped emissions for summing said first wavelength and said sixth wavelength to produce as an output of said modulating means the photodissociating emission at said second wavelength, where the sum of said first wavelength and said sixth wavelength is equal to said second wavelength.

6. A tunable anti-Stokes Raman laser formed in accordance with claim 1 wherein said alkali halide lasing medium comprises sodium iodine (NaI).

* * * * *